(12) United States Patent
Kageyama et al.

(10) Patent No.: US 11,084,439 B2
(45) Date of Patent: Aug. 10, 2021

(54) VEHICLE-MOUNTED POWER SUPPLY APPARATUS

(71) Applicant: Panasonic Intellectual Property Management Co., Ltd., Osaka (JP)

(72) Inventors: Youichi Kageyama, Fukushima (JP); Takashi Higashide, Fukushima (JP); Katsunori Atago, Fukushima (JP); Kazuo Takenaka, Fukushima (JP); Hisao Hiragi, Saitama (JP); Yugo Setsu, Fukushima (JP); Hiroki Nishinaka, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/767,116

(22) PCT Filed: Dec. 6, 2018

(86) PCT No.: PCT/JP2018/044814
§ 371 (c)(1),
(2) Date: May 27, 2020

(87) PCT Pub. No.: WO2019/116997
PCT Pub. Date: Jun. 20, 2019

(65) Prior Publication Data
US 2020/0369228 A1 Nov. 26, 2020

(30) Foreign Application Priority Data

Dec. 11, 2017 (JP) .............................. JP2017-236575

(51) Int. Cl.
*B60R 16/033* (2006.01)
*H02J 9/06* (2006.01)
(Continued)

(52) U.S. Cl.
CPC .............. *B60R 16/033* (2013.01); *B60L 1/00* (2013.01); *G06F 1/263* (2013.01); *H02J 7/345* (2013.01);
(Continued)

(58) Field of Classification Search
CPC ............ B60R 16/03–033; H02J 7/1423; H02J 7/34–35; H02J 9/04–08; H01H 47/22–36; G06F 1/263; G06F 1/30–305
See application file for complete search history.

(56) References Cited

U.S. PATENT DOCUMENTS

| 5,767,587 | A  | * | 6/1998 | Nishikiori | ................. | B60L 3/00 |
|---|---|---|---|---|---|---|
| | | | | | | 307/9.1 |
| 2003/0233589 | A1 | * | 12/2003 | Alvarez | ................. | G06F 1/263 |
| | | | | | | 713/300 |
| 2009/0001926 | A1 | * | 1/2009 | Sato | ........................ | B60L 3/003 |
| | | | | | | 320/102 |
| 2009/0326727 | A1 | * | 12/2009 | Gothard | .................... | G06F 1/30 |
| | | | | | | 700/292 |

(Continued)

FOREIGN PATENT DOCUMENTS

JP 2016-107877 6/2016

OTHER PUBLICATIONS

International Search Report of PCT application No. PCT/JP2018/044814 dated Mar. 5, 2019.

*Primary Examiner* — Rexford N Barnie
*Assistant Examiner* — David A Shiao
(74) *Attorney, Agent, or Firm* — Westerman, Hattori, Daniels & Adrian, LLP

(57) ABSTRACT

When the output voltage of a vehicle battery is lower than a lower limit value of an activation voltage, a power storage is charged with electric power supplied from the outside to a contactless power receiver, and thus the electric power stored in the power storage is supplied to a controller via a discharger to enable the controller to be activated. After the controller is activated, the controller causes a battery relay to be connected using the electric power supplied from the (Continued)

power storage via the discharger. Electric power is supplied from a high voltage battery to the vehicle battery to enable the vehicle battery to output a voltage higher than or equal to the lower limit value and enable a plurality of relays to be connected.

4 Claims, 5 Drawing Sheets

(51) Int. Cl.
*G06F 1/26* (2006.01)
*H02J 7/34* (2006.01)
*B60L 1/00* (2006.01)
*H02J 50/00* (2016.01)
*H01H 47/22* (2006.01)

(52) U.S. Cl.
CPC ............. *H02J 9/06* (2013.01); *H01H 47/22* (2013.01); *H02J 50/00* (2016.02); *H02J 2207/10* (2020.01); *H02J 2207/20* (2020.01)

(56) References Cited

U.S. PATENT DOCUMENTS

| | | | | |
|---|---|---|---|---|
| 2012/0112684 A1* | 5/2012 | Xu | .......................... | B60L 53/22 |
| | | | | 320/101 |
| 2013/0320911 A1* | 12/2013 | Kamiya | .................. | B60L 53/22 |
| | | | | 320/101 |
| 2015/0001926 A1* | 1/2015 | Kageyama | ............. | E05B 81/86 |
| | | | | 307/10.1 |
| 2015/0183329 A1* | 7/2015 | Nakaya | ................... | H02S 40/38 |
| | | | | 307/9.1 |
| 2018/0001772 A1* | 1/2018 | Jang | ...................... | B60L 53/305 |

* cited by examiner

VEHICLE-MOUNTED POWER SUPPLY APPARATUS

CROSS-REFERENCE TO RELATED APPLICATIONS

This application is a U.S. national stage application of the PCT International Application No. PCT/JP2018/044814 filed on Dec. 6, 2018, which claims the benefit of foreign priority of Japanese patent application No. 2017-236575 filed on Dec. 11, 2017, the contents all of which are incorporated herein by reference.

TECHNICAL FIELD

The present disclosure relates to vehicle-mounted power supply apparatuses used in various types of vehicles.

BACKGROUND ART

Hereinafter, a conventional vehicle-mounted power supply apparatus will be described with reference to the drawings. FIG. 5 is a block diagram illustrating the configuration of a conventional vehicle-mounted power supply apparatus; vehicle-mounted power supply apparatus 1 includes high voltage battery 2, vehicle battery 3, electrical junction box 4, and DC-DC converters 5, 6. In vehicle-mounted power supply apparatus 1, electric power stored in high voltage battery 2 is supplied to load 7 via electrical junction box 4 and DC-DC converter 5, and is supplied to load 8 via electrical junction box 4 and DC-DC converter 6.

In order to ensure the safety of a passenger, vehicle 9 on which high voltage battery 2 is mounted, and the like, high voltage battery 2 is electrically disconnected from loads 7, 8 by electrical junction box 4 while vehicle 9 is not in operation. When vehicle 9 is activated, vehicle battery 3 causes the disconnected state at electrical junction box 4 to be lifted. Furthermore, while vehicle 9 is in operation, high voltage battery 2 is electrically connected to loads 7, 8 by electrical junction box 4. Operations of these electrical connection and disconnection between high voltage battery 2 and each of loads 7, 8 by electrical junction box 4 are performed using electric power supplied from vehicle battery 3 to electrical junction box 4.

Note that Patent Literature (PTL) 1, for example, is known as related art document information pertaining to the disclosure of the present application.

CITATION LIST

Patent Literature

PTL 1: Unexamined Japanese Patent Publication No. 2016-107877

SUMMARY OF THE INVENTION

A vehicle-mounted power supply apparatus according to the present disclosure includes: a first battery; a second battery outputting an activation voltage lower than an output voltage of the first battery; an electrical junction box including a plurality of relays and a controller, the plurality of relays being connected or disconnected using the activation voltage to distribute and output electric power received from the first battery or shut off the electric power received from the first battery, the controller controlling the connection or the disconnection of the plurality of relays using the activation voltage to cause, the plurality of relays to be connected upon activation and to be disconnected upon stopping of an operation; and a backup power supply including a power storage, a contactless power receiver, and a discharger, the backup power supply supplying driving power to a battery relay that is one of the plurality of relays, the backup power supply supplying driving power to the controller, the contactless power receiver being connected to a charging path of the power storage and being capable of contactlessly receiving electric power, the discharger being connected to a discharging path of the power storage, the battery relay supplying charging power from the first battery to the second battery. As the activation voltage output from the second battery is lower than a lower limit value that is predetermined, the power storage is charged with electric power supplied from the outside to the contactless power receiver. The electric power stored in the power storage is supplied to the controller via the discharger to enable the controller to be activated. After the controller is activated, the controller causes the battery relay to be connected using the electric power supplied from the power storage via the discharger. Electric power is supplied from the first battery to the second battery to enable the second battery to output a voltage higher than or equal to the lower limit value and enable the plurality of relays to be connected.

DESCRIPTION OF EMBODIMENTS

Figure 5:
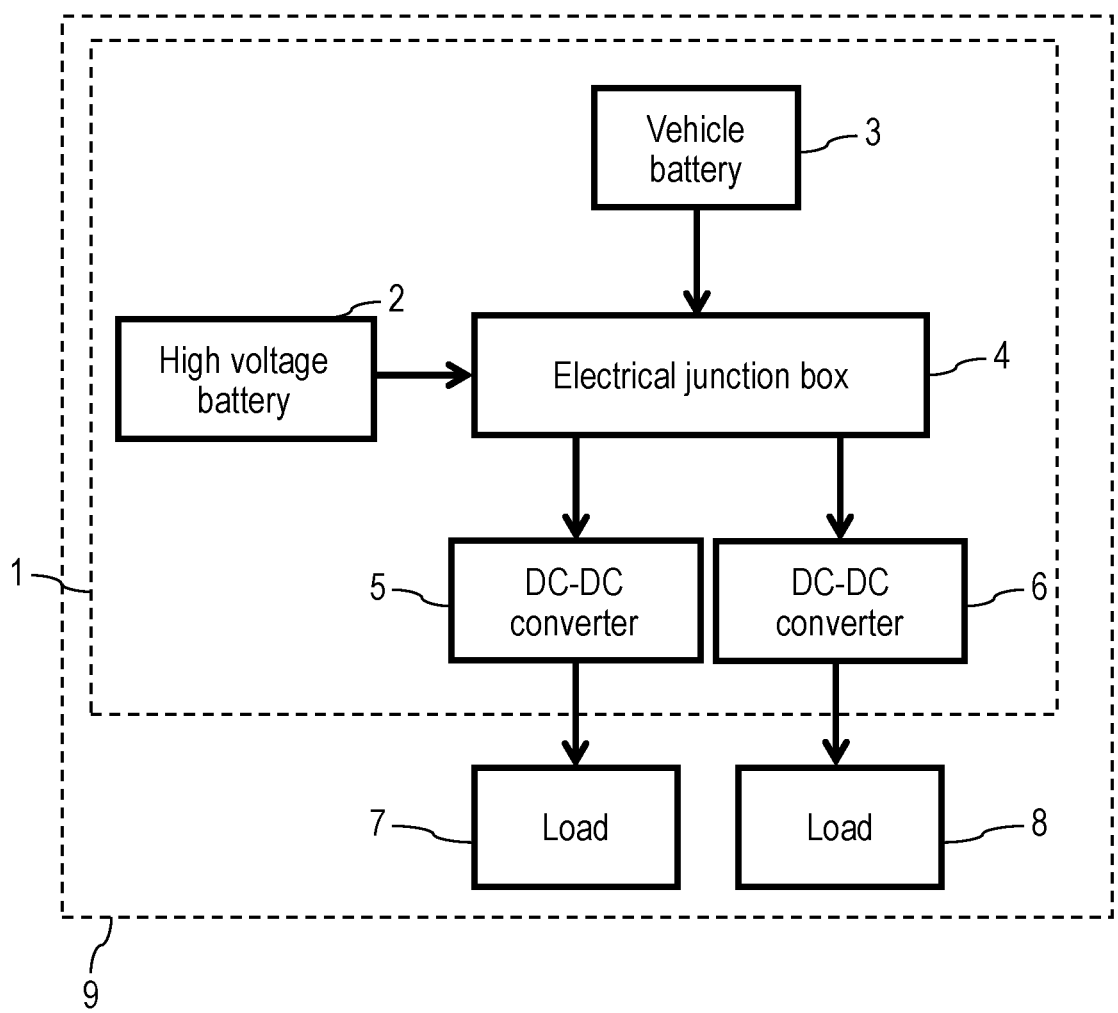
FIG. 5 is a block diagram of the configuration of a conventional vehicle power supply apparatus.

In conventional vehicle-mounted power supply apparatus 1 described with reference to FIG. 5, when deterioration of vehicle battery 3 causes the battery to run out, the disconnected state at electrical junction box 4 cannot be canceled despite high voltage battery 2 having electric power stored therein. As a result, it is not possible to activate vehicle 9; thus, there is the problem that immediate replacement of vehicle battery 3 is required to activate vehicle 9.

Hereinafter, an exemplary embodiment of the present disclosure will be described with reference to the drawings.

EXEMPLARY EMBODIMENT

[Configuration of Vehicle-mounted Power Supply Apparatus 10]

First, the vehicle-mounted power supply apparatus will be described with reference to FIG. 1.

Figure 1:
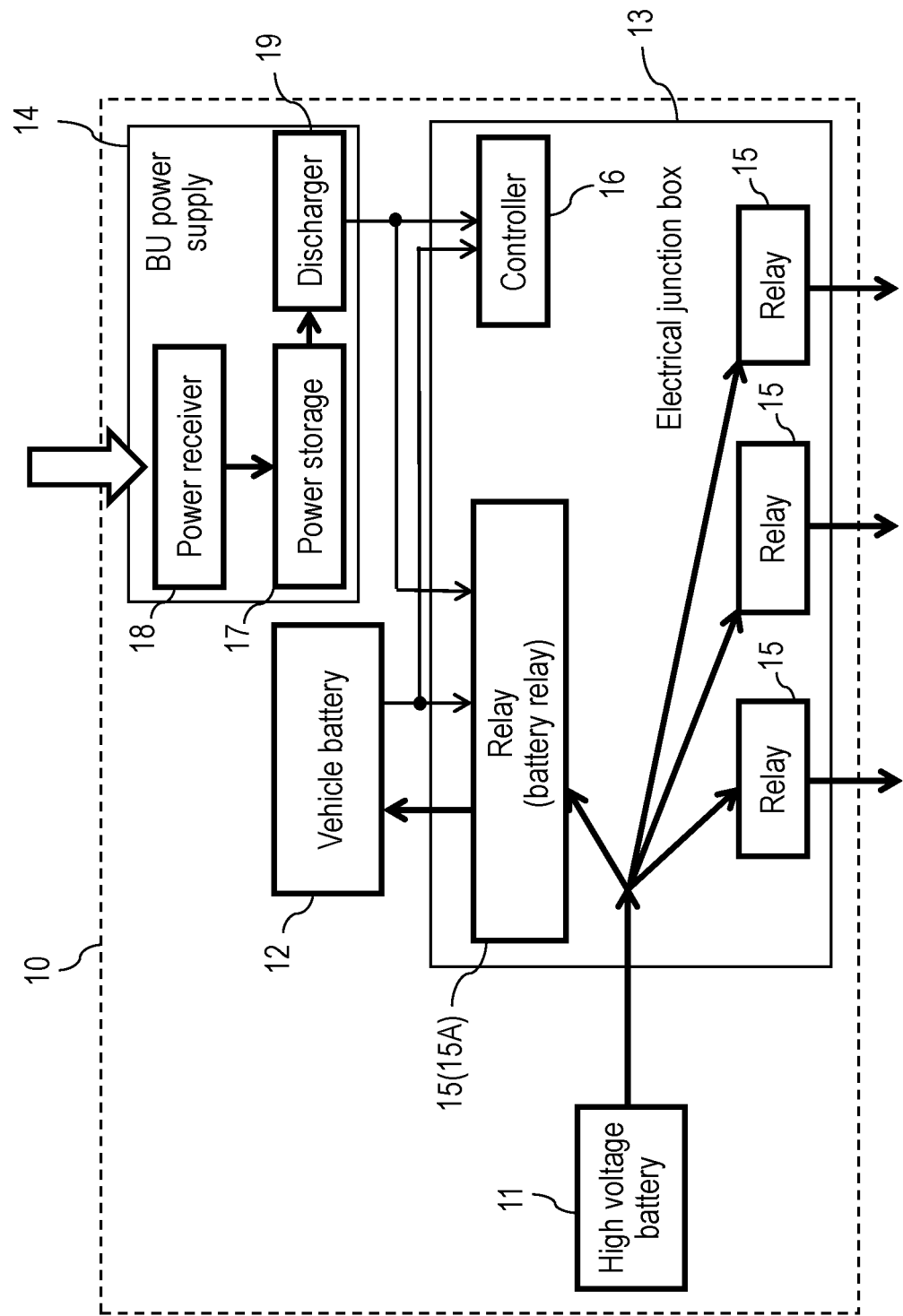
FIG. 1 is a circuit block diagram illustrating the configuration of a vehicle-mounted power supply apparatus according to an exemplary embodiment of the present disclosure.

FIG. 1 is a circuit block diagram illustrating the configuration of vehicle-mounted power supply apparatus 10 according to an exemplary embodiment of the present disclosure. Vehicle-mounted power supply apparatus 10 includes high voltage battery 11, vehicle battery 12, electrical junction box 13, and backup power supply (BU electrode) 14.

Electrical junction box 13 includes a plurality of relays 15 and controller 16. The plurality of relays 15 perform a connecting or disconnecting operation using, as driving power, activation voltage Vb output from vehicle battery 12.

Note that in FIG. 1 and FIGS. 2 and 4 to be described later, there are cases where supply lines for supplying electric power from vehicle battery 12 to the plurality of relays 15 are not illustrated to avoid making the drawings complicated.

Controller 16 performs connecting or disconnecting control on the plurality of relays 15 using, as driving power, activation voltage Vb output from vehicle battery 12. When electrical junction box 13 is activated, the plurality of relays 15 are connected. When electrical junction box 13 is stopped, the plurality of relays 15 are disconnected.

Figure 2:
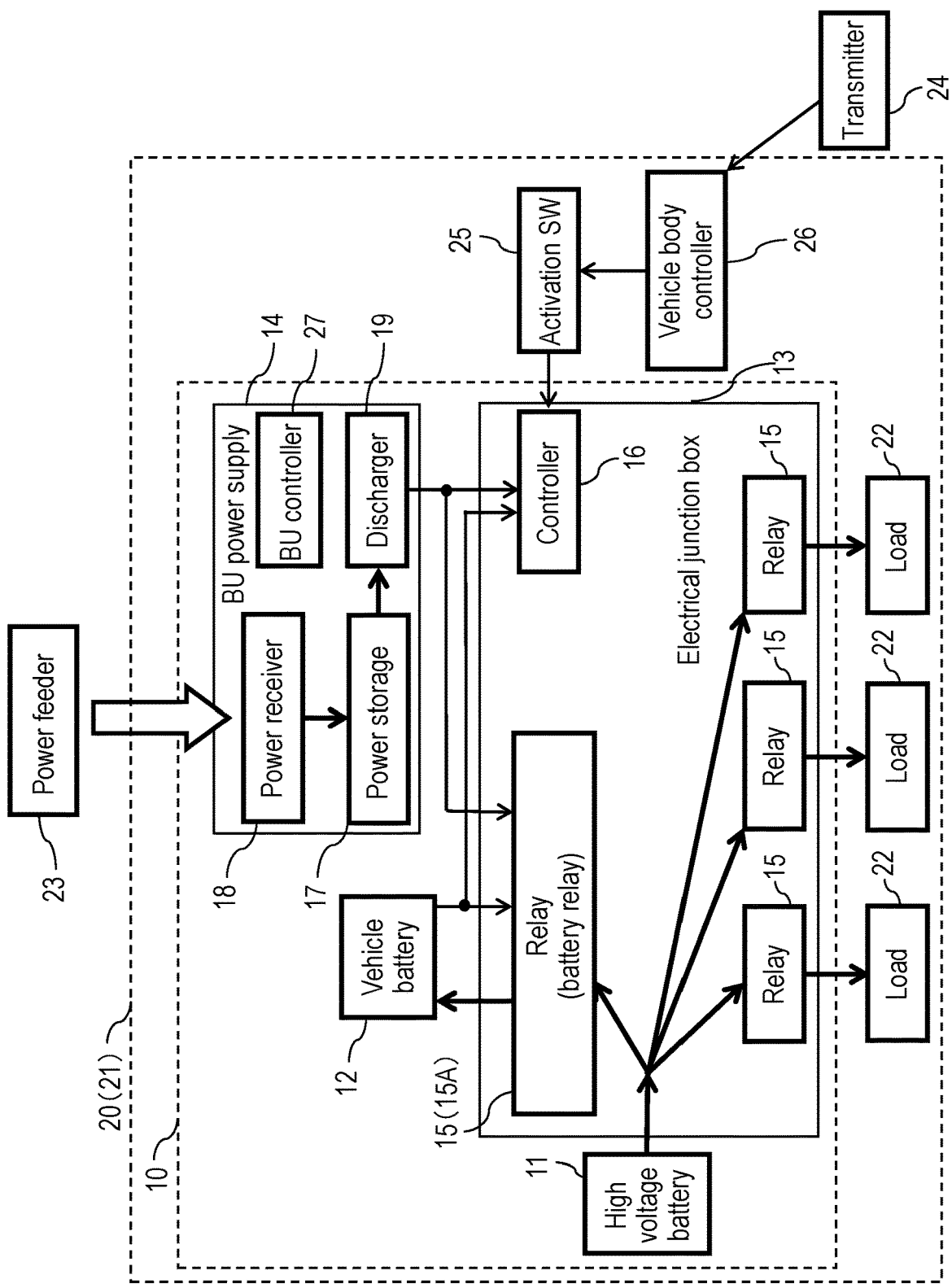
FIG. 2 is a second circuit block diagram illustrating the configuration of a vehicle with a vehicle-mounted power supply apparatus mounted thereon according to an exemplary embodiment of the present disclosure.

Note that in FIG. 1 and FIG. 2, control lines of controller 16 are not illustrated to avoid making the drawings complicated.

Backup power supply 14 includes power storage 17, contactless power receiver 18, and discharger 19. Contactless power receiver 18 is capable of contactlessly receiving electric power and is connected to a charging path of power storage 17. Discharger 19 is connected to a discharging path of power storage 17. High voltage battery 11 supplies electric power to vehicle battery 12 via battery relay 15A included in the plurality of relays 15. Discharger 19 supplies driving power for controller 16 and driving power for battery relay 15A.

When the terminal voltage of vehicle battery 12 is lower than a lower limit value of activation voltage Vb, power storage 17 is charged with electric power supplied from the outside to contactless power receiver 18. Subsequently, the electric power stored in power storage 17 is supplied to controller 16 via discharger 19, enabling controller 16 to be activated. And after controller 16 is activated, controller 16 causes battery relay 15A to be connected. Furthermore, electric power is supplied from high voltage battery 11 to vehicle battery 12; thus, vehicle battery 12 can output a voltage higher than or equal to the lower limit value of activation voltage Vb, and the plurality of relays 15 can be connected.

With the above configuration and operations, even when electrical junction box 13 cannot be activated (in other words, vehicle 20 (refer to FIG. 2) cannot be activated) due to voltage deficiency resulting from vehicle battery 12 running out of power, it is possible to start vehicle 20 with a simple operation. In short, by temporarily supplying electric power to backup power supply 14 through contactless power feeding, it becomes possible to activate electrical junction box 13, enabling vehicle activation.

First, backup power supply 14 activates a portion of electrical junction box 13 so that electric power can be supplied from high voltage battery 11 to vehicle battery 12. Here, battery relay 15A which is one of the plurality of relays 15 is activated, and vehicle battery 12 is charged. Since only one relay (battery relay 15A) among the plurality of relays 15 is activated, electric power required in the activation is low. As a result, vehicle battery 12 at least temporarily becomes able to activate the whole of electrical junction box 13. In other words, vehicle 20 (refer to FIG. 2) can be activated. This means that even when vehicle battery 12 runs out of power, vehicle 20 can be easily activated.

[Configuration of Vehicle 20]

Next, with reference to FIG. 2 and FIG. 3, the configuration and operations of vehicle 20 with vehicle-mounted power supply apparatus 10 mounted thereon will be described.

Note that elements that are substantially the same as the elements of vehicle-mounted power supply apparatus 10 described with reference to FIG. 1 are assigned the same reference marks and description of said elements may be omitted.

FIG. 2 is a block diagram illustrating the configuration of vehicle 20 with vehicle-mounted power supply apparatus 10 mounted thereon according to an exemplary embodiment of the present disclosure. FIG. 3 is a flowchart illustrating the operations of vehicle 20 with vehicle-mounted power supply apparatus 10 mounted thereon according to an exemplary embodiment of the present disclosure.

First, the configuration of vehicle 20 with vehicle-mounted power supply apparatus 10 mounted thereon is as follows. Vehicle 20 includes vehicle body 21, and vehicle-mounted power supply apparatus 10 is mounted on vehicle body 21. Vehicle-mounted power supply apparatus 10 includes high voltage battery 11, vehicle battery 12, electrical junction box 13, and backup power supply 14. Vehicle 20 may be configured so that the entire driving energy is supplied from high voltage battery 11 or may be configured so that a portion of the driving energy is supplied from high voltage battery 11.

Electrical junction box 13 includes a plurality of relays 15 and controller 16. The plurality of relays 15 perform a connecting or disconnecting operation using, as driving power, activation voltage Vb output from vehicle battery 12. When relay 15 is connected, high voltage battery 11 supplies electric power to load 22. Controller 16 performs connecting or disconnecting control on the plurality of relays 15 using, as driving power, activation voltage Vb output from vehicle battery 12.

Backup power supply 14 includes power storage 17, contactless power receiver 18, and discharger 19. Contactless power receiver 18 is capable of contactlessly receiving electric power from power feeder 23 provided outside of vehicle 20 independently of vehicle 20. Contactless power receiver 18 is connected to a charging path of power storage 17. Discharger 19 is connected to a discharging path of power storage 17. Discharger 19 supplies driving power for controller 16 and driving power for battery relay 15A. Battery relay 15A which is one of the plurality of relays 15 is provided in a path in which charging power is supplied from high voltage battery 11 to vehicle battery 12.

Next, the operations of vehicle 20 with vehicle-mounted power supply apparatus 10 mounted thereon will be described with reference to FIG. 2 and FIG. 3.

[State in which Vehicle Battery Voltage is Normal]

The following first describes one example of the operation performed when the terminal voltage of vehicle battery 12 is higher than or equal to the lower limit value of activation voltage Vb for activating vehicle 20. Here, vehicle 20 is in a state in which normal activation thereof is possible.

Figure 3:
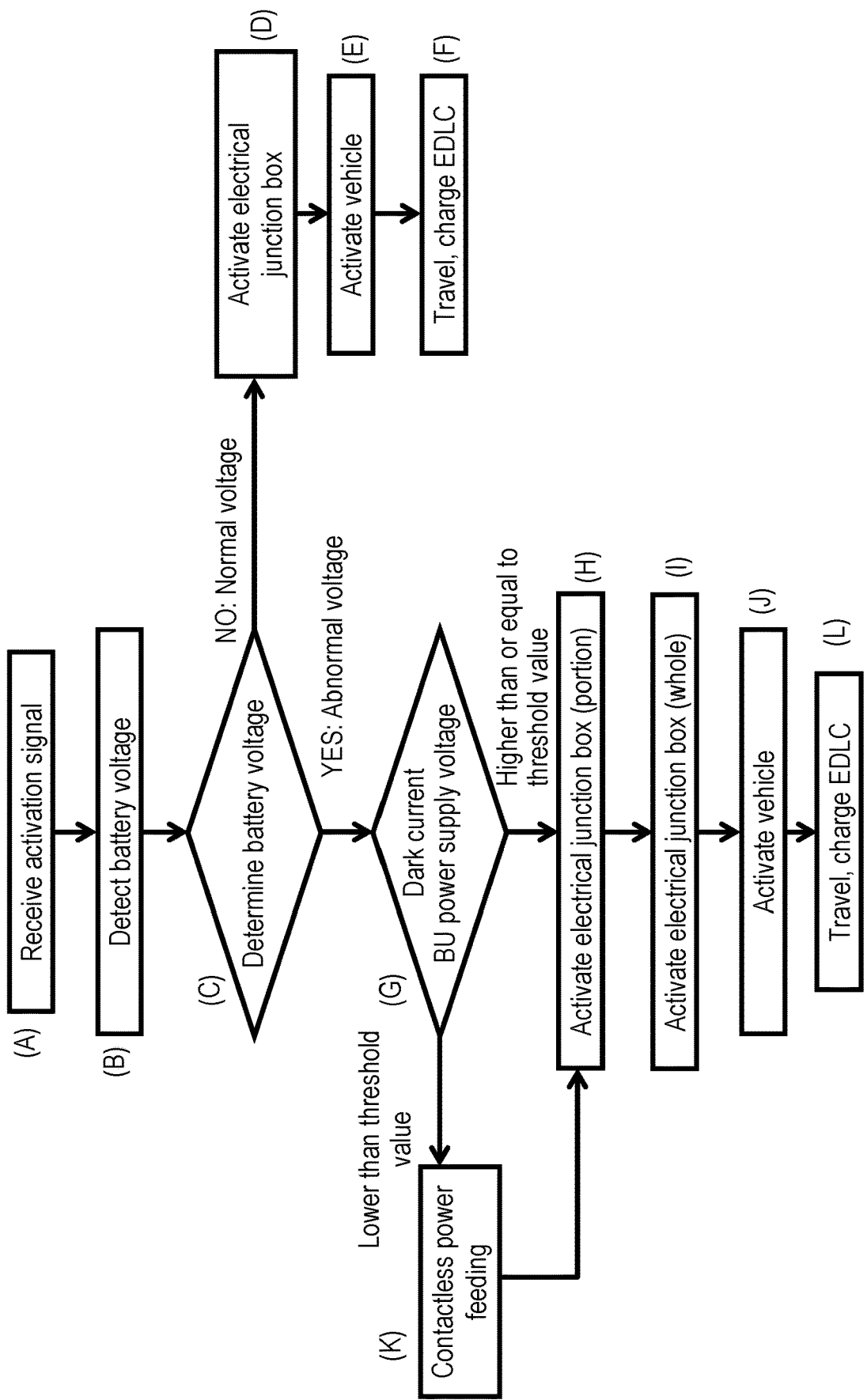
FIG. 3 is a first flowchart illustrating the operations of a vehicle with a vehicle-mounted power supply apparatus mounted thereon according to an exemplary embodiment of the present disclosure.

As illustrated in FIG. 2 or FIG. 3, first, when vehicle 20 is in a standby state (not in operation), a passenger operates transmitter 24 to cause vehicle body controller 26 to receive an activation signal (Step (A)), and thus vehicle body controller 26 switches the status of activation switch (activation SW) 25 from OFF to ON. Note that one example of transmitter 24 is a key. One example of activation switch 25 is an engine switch.

Next, for example, vehicle body controller 26 detects voltages of high voltage battery 11 and vehicle battery 12 (Step (B)). Subsequently, when vehicle body controller 26 determines that there is no abnormality in the voltages of both high voltage battery 11 and vehicle battery 12 (NO in Step (C)), controller 16 is activated on the basis of said determination.

Although not illustrated in FIG. 2, electric power to be used to drive vehicle body controller 26 and controller 16 is supplied from vehicle battery 12.

Note that in the present exemplary embodiment, vehicle body controller 26 and controller 16 are illustrated and described as separate controlling bodies for ease of explanation of functions, but vehicle body controller 26 and controller 16 may be provided on vehicle body 21 or electrical junction box 13 as a single controlling body.

Next, since controller 16 is activated and there are no abnormalities in the voltages of high voltage battery 11 and vehicle battery 12, controller 16 causes relay 15 to be connected.

Note that in FIGS. 1 and 2 and FIG. 4 to be described later, there are cases where a part of signal lines, such as a controlling signal line for use in the output from vehicle body controller 26 or controller 16, is not illustrated to avoid making the drawings complicated. For the same reason, there are cases where supply lines for supplying electric power from vehicle battery 12 to the plurality of relays 15 are not illustrated.

In the present exemplary embodiment, a mechanical relay is used as relay 15; since a relatively large amount of electric power is required to drive the mechanical relay, relay 15 which is a mechanical relay receives driving power supplied from vehicle battery 12 when receiving, from controller 16, a signal related to the connecting or disconnecting control.

As described above, as a result of the control performed by controller 16 and the supplying of the driving power from vehicle battery 12, the relay is connected. In other words, as a result of the control performed by controller 16 and the supplying of the driving power from vehicle battery 12, electrical junction box 13 is activated (Step (D)).

These operations allow load 22 connected to relay 15 to operate using the electric power from high voltage battery 11. In other words, vehicle 20 is activated (Step (E)) and becomes able to travel (Step (F)). Note that the operation in Step (E) and the operation in Step (D) may be treated as one operation.

Note that in the exemplary embodiment illustrated in FIG. 2, load 22 directly uses the voltage output from vehicle battery 12, but load 22 is not necessarily driven with the voltage output from vehicle battery 12. In that case, as illustrated in FIG. 4, a voltage converter such as DC-DC converter 28 may be provided between load 22 and relay 15.

In a state in which vehicle 20 can travel after activation (Step (F)), power storage 17 of backup power supply 14 may be charged to an arbitrary voltage. For example, in the case where an electric double-layer capacitor (EDLC) is used for power storage 17, power storage 17 may stay charged to a level at which deterioration thereof does not progress while vehicle 20 is in operation.

[State in which Vehicle Battery Voltage is Abnormal]

Next, the case where the terminal voltage of vehicle battery 12 is lower than the lower limit value of activation voltage Vb for activating vehicle 20 will be described. In other words, one example of the operations of vehicle 20 performed when vehicle 20 cannot be normally activated will be described with reference to FIG. 2 and FIG. 3.

The operation in Step (A) is the same as that described earlier and thus, description thereof is omitted.

Next, vehicle body controller 26 detects the voltages of high voltage battery 11 and vehicle battery 12 (Step (B)). Subsequently, when there is an abnormality in vehicle battery 12 (when the terminal voltage of vehicle battery 12 is lower than the lower limit value of activation voltage Vb), the voltage is determined as being abnormal (YES in Step (C)). At this time, vehicle 20 is not activated, and electrical junction box 13 is not activated. Since the terminal voltage of vehicle battery 12 is lower than the lower limit value of activation voltage Vb, even if controller 16 is driven and outputs a control signal, relays 15 cannot be driven, and electrical junction box 13 cannot be activated. In other words, as a result of the terminal voltage of vehicle battery 12 being lower than the lower limit value of activation voltage Vb, relays 15 remain disconnected after the operation of vehicle 20 is stopped. Therefore, in this state, no electric power is supplied to loads 22, and thus loads 22 are not driven.

In the above-described operation, it is assumed that vehicle body controller 26 is activated using a dark current of vehicle battery 12, but, when vehicle battery 12 cannot output even the dark current to vehicle body controller 26, vehicle body controller 26 cannot detect the voltages of high voltage battery 11 and vehicle battery 12. In short, the operation in Step (B) cannot be performed. Furthermore, at the same time, the operation for comparing or determining the voltages of high voltage battery 11 and vehicle battery 12 (Step (C)) cannot be performed. At this time, it is, of course, not possible to drive relay 15, and relay 15 remains disconnected after the operation of vehicle 20 is stopped. Therefore, in this state, no electric power is supplied to loads 22, and thus loads 22 are not driven. Furthermore, when, as a result of the comparison or determination of the voltages of high voltage battery 11 and vehicle battery 12 in Step (C), it is determined, for example, that there is an abnormality in vehicle battery 12, information indicating that vehicle battery 12 is abnormal (has run out of power) may be shown on a display (not illustrated in the drawings). The dark current of vehicle battery 12 is used to indicate the abnormal state on the display.

Furthermore, in the operation in Step (C), particularly when relay 15 cannot be connected due to vehicle battery 12 running out of power (in other words, when vehicle 20 cannot be activated due to electrical junction box 13 being unable to be activated), the electric power stored in power storage 17 of backup power supply 14 is used to activate controller 16 and activate, in particular, battery relay 15A among the plurality of relays 15.

For example, even when the terminal voltage of vehicle battery 12 is lower than the lower limit value of activation voltage Vb (YES in Step (C)), in the case where controller 16 determines that the dark current of vehicle battery 12 has a value that allows controller 16 to be driven and a voltage higher than or equal to the lower limit value of activation voltage Vb is left in power storage 17, it is possible to drive battery relay 15A (in Step (G), higher than or equal to the threshold value).

When the above dark current and residual voltage conditions are satisfied, the electric power in power storage 17 is supplied to controller 16 via discharger 19 as electric power for reliably driving controller 16. In addition, while the electric power continues to be supplied from power storage 17 to controller 16, the electric power in power storage 17 is further supplied to battery relay 15A via discharger 19 as electric power for driving battery relay 15A. This means that a portion of electrical junction box 13 can be activated (Step (H)). Note that the transition of operation from Step (G) to Step (H) is continuous.

In particular, when an electric double-layer capacitor is used as a power storage element for power storage 17, it is possible to supply a large electric current within a short period of time. This enables power storage 17 to also supply driving electric power to battery relay 15A which is a mechanical relay, resulting in increased reliability in the connecting operation at battery relay 15A.

Subsequently, with the electric power from backup power supply 14, continuous driving of controller 16 and driving of battery relay 15A are possible, and thus it is possible to connect battery relay 15A. As a result of battery relay 15A being connected, electric power is supplied from high voltage battery 11 to vehicle battery 12 (in other words, high voltage battery 11 charges vehicle battery 12). At this time, activation voltage Vb higher than or equal to the lower limit value is applied to vehicle battery 12 via battery relay 15A. This enables vehicle battery 12 to supply, to all relays 15 in electrical junction box 13, electric power that allows relays 15 to be driven. This means that the whole of electrical junction box 13 can be activated (Step (I)). As a result, loads 22 can operate using the electric power from high voltage battery 11. Subsequently, vehicle 20 is activated and becomes able to travel (Step (J)).

On the other hand, for example, when activation voltage Vb of vehicle battery 12 is lower than the lower limit value and thus determined as being abnormal (YES in Step (C)) and the dark current of vehicle battery 12 does not have a value that allows controller 16 to be driven or when controller 16 determines that a voltage higher than or equal to the threshold value is not left in power storage 17 even through the dark current of vehicle battery 12 has a value that allows controller 16 to be driven (in Step (G), lower than the threshold value), it is possible to drive battery relay 15A by power feeder 23 charging backup power supply 14.

Here, electric power is supplied from power feeder 23 to contactless power receiver 18 of backup power supply 14 through contactless power feeding (Step (K)), and power storage 17 is charged with the supplied electric power through contactless power receiver 18. The charging-related function herein may be included in contactless power receiver 18 or may be included in power storage 17.

At the point in time when the voltage of power storage 17 is determined to have become greater than or equal to a charging threshold value, the operation for charging power storage 17 is stopped. The determination for the charging threshold value and the control on the charging operation are preferably performed by backup controller 27. Backup controller 27 may be provided in backup power supply 14, and the electric power in power storage 17 and the electric power supplied to contactless power receiver 18 may be used to drive backup controller 27. Information indicating that the voltage of power storage 17 has become greater than or equal to the charging threshold value may be shown on the display (not illustrated in the drawings) so that the information can be recognized inside or outside of vehicle 20.

Furthermore, in Step (H) after the voltage of power storage 17 is determined to have become greater than or equal to the charging threshold value (in Step (G), higher than or equal to the threshold value), the electric power in power storage 17 is supplied to controller 16 via discharger 19 as the electric power for driving controller 16. The operations regarding charging, discharging, etc., from Step (K) to Step (H) may be performed as triggered by electric power supply from power feeder 23 to backup power supply 14 and detection of a signal from transmitter 24 by backup controller 27 at the same time or within a predetermined period.

When the electric power in power storage 17 is supplied to controller 16 via discharger 19 as the electric power for driving controller 16, this power supply continues and then, the electric power in power storage 17 is supplied to battery relay 15A via discharger 19 as the electric power for driving battery relay 15A. This means that a portion of electrical junction box 13 can be activated (Step (H)).

In particular, when an electric double-layer capacitor is used as a power storage element for power storage 17, it is possible to supply a large electric current within a short period of time. This enables power storage 17 to also supply driving electric power to battery relay 15A which is a mechanical relay, resulting in increased reliability in the connecting operation at battery relay 15A. Furthermore, this allows a reduction in size, weight, etc., of power storage 17 and backup power supply 14. Alternatively, a small lithium battery or the like may be used as a power storage element for power storage 17.

With the electric power from backup power supply 14, driving of controller 16 and driving of battery relay 15A are possible, and thus it is possible to connect battery relay 15A. As a result of battery relay 15A being connected, electric power is supplied from high voltage battery 11 to vehicle battery 12. In other words, high voltage battery 11 charges vehicle battery 12. At this time, activation voltage Vb higher than or equal to the lower limit value is applied to vehicle battery 12 via battery relay 15A. This enables vehicle battery 12 to supply, to all relays 15 in electrical junction box 13, electric power that allows relays 15 to be driven. This means that the whole of electrical junction box 13 can be activated (Step (I)).

As a result, loads 22 can operate using the electric power from high voltage battery 11. In other words, vehicle 20 is activated and becomes able to travel (Step (J)).

Subsequently, in a state in which vehicle 20 can travel after activation (Step (L)), power storage 17 of backup power supply 14 may be charged to an arbitrary voltage.

As is clear from the description above, in the present exemplary embodiment, even when electrical junction box 13 cannot be activated (in other words, vehicle 20 cannot be activated) due to voltage deficiency resulting from vehicle battery 12 running out of power, it is possible to restart vehicle 20 with a simple operation. Backup power supply 14 is temporarily supplied with electric power through the contactless power feeding from power feeder 23 disposed outside of vehicle 20 to contactless power receiver 18. Accordingly, it becomes possible to activate electrical junction box 13, enabling vehicle 20 to be restarted.

Backup power supply 14 activates a portion of electrical junction box 13 so that charging power can be supplied from high voltage battery 11 to vehicle battery 12. With a limited, small amount of electric power, controller 16 is activated, and only one battery relay 15A included in the plurality of relays 15 is controlled and thus activated. As a result, vehicle battery 12 is charged and at least temporarily becomes able to activate the whole of electrical junction box 13, in other words, vehicle 20. This means that even when vehicle battery 12 runs out of power, vehicle 20 can be easily activated.

When vehicle battery 12 runs out of power, it is, of course, not necessary to replace vehicle battery 12 on-site, and vehicle 20 can restart using power feeder 23 having low power capacity and capable of contactless power feeding.

Although not illustrated in the drawings, when vehicle 20 stops operating (in other words, electrical junction box 13 stops after activation), all of the plurality of relays 15 are disconnected.

As mentioned earlier, as illustrated in FIG. 4, in vehicle 20 on which vehicle-mounted power supply apparatus 10 according to the exemplary embodiment of the present disclosure is mounted, DC-DC converter 28 may be provided between load 22 and relay 15 as a voltage conversion function. In particular, battery converter 28A is provided between battery relay 15A and vehicle battery 12, and in the operation in Step (I), electric power is supplied from high voltage battery 11 to battery relay 15A, and thus battery converter 28 is driven. Subsequently, battery converter 28A converts the voltage of high voltage battery 11 and supplies the electric power to vehicle battery 12.

Note that after vehicle 20 is activated (Step (J)), the supplying of the driving power to battery converter 28A may be switched from the supplying from battery relay 15A to the supplying from vehicle battery 12.

Controller 16 may perform the control on DC-DC converter 28 (including battery converter 28A). DC-DC converter 28 (battery converter 28A) may be disposed inside of electrical junction box 13 or may be disposed outside of electrical junction box 13; in particular, in the case where DC-DC converter 28 and battery converter 28A are disposed inside of electrical junction box 13, operational control which controller 16 performs on DC-DC converter 28 and battery converter 28A becomes easy.

Figure 4:
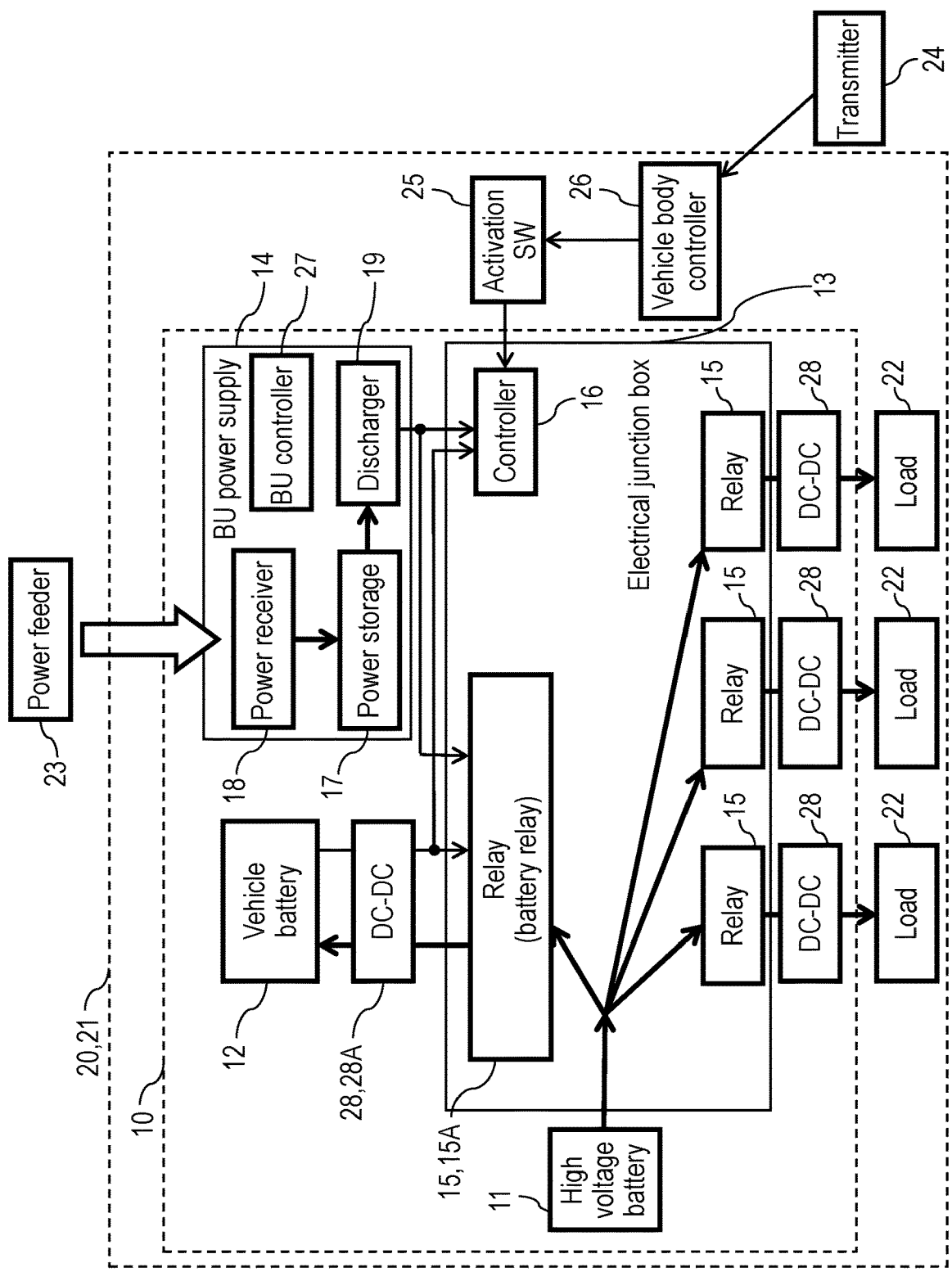
FIG. 4 is a third circuit block diagram illustrating the configuration of a vehicle with a vehicle-mounted power supply apparatus mounted thereon according to an exemplary embodiment of the present disclosure.

Note that FIG. 4 illustrates an example in which DC-DC converter 28 (including battery converter 28A) is disposed inside of electrical junction box 13.

CLOSING

Vehicle-mounted power supply apparatus 10 according to the present disclosure includes: high voltage battery 11; vehicle battery 12 which outputs activation voltage Vb lower than an output voltage of high voltage battery 11; and electrical junction box 13 which includes a plurality of relays 15 and controller 16 and in which the plurality of relays 15 are connected or disconnected using activation voltage Vb to distribute and output electric power received from high voltage battery 11 or shut off the electric power received from high voltage battery 11, controller 16 controls the connection or the disconnection of the plurality of relays 15 using activation voltage Vb, and the plurality of relays 15 are connected upon activation and disconnected upon stopping of an operation. Furthermore, vehicle-mounted power supply apparatus 10 includes backup power supply 14 which includes power storage 17, contactless power receiver 18, and discharger 19, supplies driving power to battery relay 15A that is one of the plurality of relays 15, and supplies driving power to controller 16 and in which contactless power receiver 18 is connected to a charging path of power storage 17 and is capable of contactlessly receiving electric power, discharger 19 is connected to a discharging path of power storage 17, and battery relay 15A supplies charging power from high voltage battery 11 to vehicle battery 12. When activation voltage Vb output from vehicle battery 12 is lower than a lower limit value that is predetermined, power storage 17 is charged with electric power supplied from outside to contactless power receiver 18. The electric power stored in power storage 17 is supplied to controller 16 via discharger 19 to enable controller 16 to be activated. After controller 16 is activated, controller 16 causes battery relay 15A to be connected using the electric power supplied from power storage 17 via discharger 19. Electric power is supplied from high voltage battery 11 to vehicle battery 12 to enable vehicle battery 12 to output a voltage higher than or equal to lower limit value Vb and enable the plurality of relays 15 to be connected.

According to the present disclosure, even when vehicle 20 cannot be activated due to vehicle battery 12 running out of power, electric power is temporarily supplied to backup power supply 14 through contactless power feeding, and thus backup power supply 14 can activate a portion of electrical junction box 13 so that charging power can be supplied from high voltage battery 11 to vehicle battery 12. As a result, vehicle battery 12 at least temporarily becomes able to activate the whole of electrical junction box 13. In other words, vehicle battery 12 can activate vehicle 20. This means that even when vehicle battery 12 runs out of power, vehicle 20 can be easily activated.

In vehicle-mounted power supply apparatus 10 according to the present disclosure, an electric double-layer capacitor may be used as a power storage element for power storage 17.

When an electric double-layer capacitor is used as a power storage element for power storage 17, it is possible to supply a large electric current to vehicle-mounted power supply apparatus 10 according to the present disclosure within a short period of time.

Vehicle-mounted power supply apparatus 10 according to the present disclosure may further include battery converter 28A between battery relay 15A and vehicle battery 12. Battery converter 28A is driven by high voltage battery 11 supplying electric power to battery converter 28A via battery relay 15A, and high voltage battery 11 can supply the electric power to vehicle battery 12 with a voltage converted by battery converter 28A.

INDUSTRIAL APPLICABILITY

The vehicle-mounted power supply apparatus according to the present disclosure has the advantageous effect of easily enabling a vehicle to be activated even when the battery runs out, and is useful in various types of vehicles.

REFERENCE MARKS IN THE DRAWINGS 1, 10 vehicle-mounted power supply apparatus
2, 11 high voltage battery (first battery)
3, 12 vehicle battery (second battery)
4, 13 electrical junction box
5, 6 DC-DC converter
7, 8 load
9 vehicle
14 backup power supply
15 relay
15A battery relay
16 controller
17 power storage
18 contactless power receiver
19 discharger
20 vehicle
21 vehicle body
22 load
23 power feeder
24 transmitter
25 activation switch
26 vehicle body controller
27 backup controller
28 DC-DC converter
28A battery converter

The invention claimed is:

1. A vehicle-mounted power supply apparatus, comprising:
   a first battery;
   a second battery outputting an activation voltage lower than an output voltage of the first battery;
   an electrical junction box including a plurality of relays and a controller,
      the plurality of relays being connected or disconnected using the activation voltage to distribute and output electric power received from the first battery or shut off the electric power received from the first battery,
      the controller controlling the connection or the disconnection of the plurality of relays using the activation voltage to cause the plurality of relays to be connected upon activation and to be disconnected upon stopping of an operation; and
   a backup power supply including a power storage, a contactless power receiver, and a discharger, the backup power supply supplying driving power to a battery relay that is one of the plurality of relays, the backup power supply supplying driving power to the controller,
      the contactless power receiver being connected to a charging path of the power storage and being capable of contactlessly receiving electric power,
      the discharger being connected to a discharging path of the power storage,
      the battery relay supplying charging power from the first battery to the second battery, wherein
   as the activation voltage output from the second battery is lower than a lower limit value that is predetermined, the power storage is charged with electric power supplied from outside of the vehicle-mounted power supply apparatus to the contactless power receiver,
   the electric power stored in the power storage is supplied to the controller via the discharger to enable the controller to be activated,
   after the controller is activated, the controller causes the battery relay to be connected using the electric power supplied from the power storage via the discharger, and
   electric power is supplied from the first battery to the second battery to enable the second battery to output a voltage higher than or equal to the lower limit value and enable the plurality of relays to be connected.

2. The vehicle-mounted power supply apparatus according to claim 1, wherein
   an electric double-layer capacitor is used as a power storage element for the power storage.

3. The vehicle-mounted power supply apparatus according to claim 2, further comprising:
   a battery converter between the battery relay and the second battery, wherein
   the battery converter is driven by the first battery supplying electric power to the battery converter via the battery relay, and
   the first battery supplies the electric power to the second battery with a voltage converted by the battery converter.

4. The vehicle-mounted power supply apparatus according to claim 1, further comprising:
   a battery converter between the battery relay and the second battery, wherein
   the battery converter is driven by the first battery supplying electric power to the battery converter via the battery relay, and
   the first battery supplies the electric power to the second battery with a voltage converted by the battery converter.

* * * * *